(12) United States Patent
Zhang et al.

(10) Patent No.: US 9,557,177 B2
(45) Date of Patent: Jan. 31, 2017

(54) MULTI-SENSOR MERGING BASED SUPER-CLOSE DISTANCE AUTONOMOUS NAVIGATION APPARATUS AND METHOD

(71) Applicant: HUAZHONG UNIVERSITY OF SCIENCE AND TECHNOLOGY, Wuhan, Hubei (CN)

(72) Inventors: Tianxu Zhang, Hubei (CN); Sufei Fan, Hubei (CN); Yimeng Chen, Hubei (CN); Heng Yao, Hubei (CN); Zhengtao Li, Hubei (CN); Zheng Wang, Hubei (CN); Wei Huang, Hubei (CN); Zhenghua Huang, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/105,459

(22) PCT Filed: Feb. 10, 2015

(86) PCT No.: PCT/CN2015/072696
§ 371 (c)(1),
(2) Date: Jun. 16, 2016

(87) PCT Pub. No.: WO2016/106961
PCT Pub. Date: Jul. 7, 2016

(65) Prior Publication Data
US 2016/0363451 A1 Dec. 15, 2016

(30) Foreign Application Priority Data
Dec. 30, 2014 (CN) .................... 2014 1 08429138

(51) Int. Cl.
*G01C 21/20* (2006.01)
(52) U.S. Cl.
CPC .................... *G01C 21/20* (2013.01)

(58) Field of Classification Search
CPC combination set(s) only.
See application file for complete search history.

(56) References Cited

U.S. PATENT DOCUMENTS

| | | | |
|---|---|---|---|
| 2005/0110621 A1* | 5/2005 | Hahn | B60R 1/00 340/435 |
| 2006/0171560 A1* | 8/2006 | Manus | H04N 7/181 382/103 |
| 2015/0242700 A1* | 8/2015 | Zhang | G06K 9/4604 382/154 |

FOREIGN PATENT DOCUMENTS

| | | |
|---|---|---|
| CN | 101644580 | 2/2010 |
| CN | 102053249 | 5/2011 |

(Continued)

*Primary Examiner* — Thomas Tarcza
*Assistant Examiner* — Edward J Pipala
(74) *Attorney, Agent, or Firm* — Hamre, Schumann, Mueller & Larson, P.C.

(57) ABSTRACT

The present invention discloses a multi-sensor merging based super-close distance autonomous navigation apparatus and method. The apparatus includes a sensor subsystem, an information merging subsystem, a sensor scanning structure, and an orientation guiding structure, wherein a visible light imaging sensor and an infrared imaging sensor are combined together, and data are acquired by combining a passive measurement mode composed of an optical imaging sensor and an active measurement mode composed of a laser distance measuring sensor. Autonomous navigation is divided into three stages, that is, a remote distance stage, implemented by adopting a navigation mode where a binocular visible light imaging sensor and a binocular infrared imaging sensor are combined, a close distance stage, implemented by adopting a navigation mode where a binocular visible light imaging sensor, a binocular infrared imaging sensor and a laser distance measuring sensor array are combined, and an ultra-close distance stage, implemented by (Continued)

adopting a navigation mode of a laser distance measuring sensor array. Through the present invention, the field of view and the exploration range are widened, the problem of shielding existing in passive measurement is effectively solved, the precision of data measurement is ensured, and the navigation efficiency and the safety and reliability of navigation are improved.

6 Claims, 8 Drawing Sheets

(56) References Cited

FOREIGN PATENT DOCUMENTS

| | | |
|---|---|---|
| CN | 102288178 | 12/2011 |
| CN | 102928861 | 2/2013 |
| CN | 103364781 | 10/2013 |
| JP | H04218790 | 8/1992 |

* cited by examiner

MULTI-SENSOR MERGING BASED SUPER-CLOSE DISTANCE AUTONOMOUS NAVIGATION APPARATUS AND METHOD

TECHNICAL FIELD

The present invention belongs to the technical field of space visual navigation, and in particular, to a multi-sensor merging based super-close distance autonomous navigation apparatus and method, which can be used for spatial rendezvous and docking of an observation satellite, accompanying flight and formation flight, relative navigation and networking formation of a spatial object, characteristic measurement of a spatial object being in the process of spin motion or attitude adjustment in space, as well as an autonomous image navigation in the process that an observation satellite and an spatial object gradually get close to each other.

BACKGROUND ART

Relative navigation is based on the measurement of a relative distance between spacecrafts and orientation information thereof, thereby determining a relative position and attitude information. Space transportation, manned space flight, on-orbit servicing, deep space exploration, and other different space activities all involve the determination, change, and maintenance of the relative position and orientation of the spacecraft, and the success of any deep space exploration tasks are all completed on the basis of the effective navigation and control for a deep space explorer. In the applications such as geophysics and global environment exploration, earth optical imaging, atmospheric occultation detection satellite constellation, space countermeasure, satellite constellation, accompanying flight and formation flight, the space vision navigation technology plays a very important role.

Problems to be solved by the space vision navigation include: 1. detection of spatial position, orientation, and environmental information; 2. analysis, processing, and integration of the information acquired; and 3. motion path planning. An optics-based autonomous navigation mode is a navigation mode in which a spacecraft, relying on an airborne optical navigation device, independently completes a navigation task, without any optical or electrical contact with the outside world. Because of its strong independence, high precision, good real-time performance, and other advantages, the mode becomes a hot spot of the scholars around the world in recent years. The optics-based autonomous navigation mode can reduce the operation complexity, reduce the costs of the tasks, simplify a ground support system of an explorer, and greatly enhance the efficiency of deep space exploration, even in the condition that the communication contact between the explorer and the ground is completely interrupted, the daily functions including orbit determination, orbit maintenance, and attitude control can still be completed, thereby expanding the application potential of an explorer in space. In the process of super-close distance navigation, the optics-based autonomous navigation scheme is mainly adopted, and the optics-based autonomous navigation scheme is mainly divided into monocular vision navigation and binocular vision navigation. However, because of a small field angle, a limited exploration range, the presence of shielding in view, and the like, some information will be lost since it fails to be imaged onto an image plane, and the requirements of the super-close distance autonomous navigation cannot be met.

SUMMARY

With respect to the above defects or improvement demands of the prior art, the present invention provides a multi-sensor merging based super-close distance autonomous navigation apparatus and method, with the objective of implementing autonomous navigation for a spatial object within a range of 200 m. Through the present invention, the field of view and the exploration range are widened, the problem of shielding existing in passive measurement is effectively solved, the precision of data measurement is ensured, and the navigation efficiency and the safety and reliability of navigation are improved.

In order to achieve the above objective, in accordance with one aspect of the present invention, an autonomous navigation apparatus is provided, including a sensor subsystem, an information merging subsystem, a sensor scanning structure, and an orientation guiding structure; the sensor subsystem is installed on the orientation guiding structure, and includes first and second infrared imaging sensors, first and second visible light imaging sensors, and first to fifth laser distance measuring sensors; the information merging subsystem includes an infrared information processing board, a visible light information processing board, and a satellite house-keeping server; the first and second infrared imaging sensors are respectively connected to the infrared information processing board via a bus, the first and second visible light imaging sensors are respectively connected to the visible light information processing board via the bus, the first to fifth laser distance measuring sensors are respectively connected to the satellite house-keeping server, the infrared information processing board and the visible light information processing board are respectively connected to the satellite house-keeping server via the bus; and the satellite house-keeping server is configured to send a control instruction for instructing the sensor subsystem to perform attitude adjustment in combination with a binocular infrared image collected by the first and second infrared imaging sensors, a binocular visible light image collected by the first and second visible light imaging sensors, and laser data collected by the first to fifth laser distance measuring sensors; the sensor scanning structure includes first and second rotary platforms connected to the satellite house-keeping server, the first and second visible light imaging sensors are respectively installed on the first and second rotary platforms, and the satellite house-keeping server controls the first and second rotary platforms to rotate, such that the first and second visible light imaging sensors can implement spatial object scanning within a range of a field of view; the orientation guiding structure includes a 2-DOF pan-tilt and a pan-tilt servo controller; and the pan-tilt servo controller is connected to the satellite house-keeping server, for receiving a control instruction from the satellite house-keeping server, to control the 2-DOF pan-tilt to perform attitude adjustment, so as to enable the sensor subsystem to perform attitude adjustment.

Preferably, the first visible light imaging sensor, the first infrared imaging sensor, the first laser distance measuring sensor, the second infrared imaging sensor, and the second visible light imaging sensor are arranged in sequence on the same guide rail, the first visible light imaging sensor and the first infrared imaging sensor are symmetrical to the second infrared imaging sensor and the second visible light imaging sensor with respect to the first laser distance measuring sensor; the second to fifth laser distance measuring sensors have the same distance from the first laser distance measuring sensor, the second and third laser distance measuring sensors are symmetrical with respect to the guide rail, and the fourth and fifth laser distance measuring sensors are symmetrical with respect to the guide rail.

In accordance with another aspect of the present invention, an autonomous navigation method using the above apparatus is provided, which includes the following steps: (1) collecting a binocular infrared image by using first and second infrared imaging sensors, collecting a binocular visible light image by using first and second visible light imaging sensors, and detecting and positioning a spatial object by using the binocular infrared image and the binocular visible light image, to obtain a relative distance between the navigation apparatus and the spatial object; (2) judging whether the relative distance between the navigation apparatus and the spatial object is greater than 100 m, if yes, pushing the navigation apparatus towards the spatial object, and returning to step (1); and otherwise, sequentially performing step (3); (3) collecting a binocular infrared image by using the first and second infrared imaging sensors, collecting a binocular visible light image by using the first and second visible light imaging sensors, collecting laser data by using first to fifth laser distance measuring sensors, and using the binocular infrared image, the binocular visible light image, and the laser data to obtain three-dimensional structure information, three-dimensional distance information, and a three-dimensional motion parameter of the spatial object; (4) judging whether the relative distance between the navigation apparatus and the spatial object is greater than 20 m according to the three-dimensional distance information of the spatial object, if yes, pushing the navigation apparatus towards the spatial object, and returning to step (3); and otherwise, sequentially performing step (5); (5) collecting laser data by using the first to fifth laser distance measuring sensors, and using the laser data, in combination with the three-dimensional structure information and the three-dimensional motion parameter of the spatial object obtained in step (3), to obtain the relative distance and a relative attitude angle between the navigation apparatus and the spatial object; (6) judging whether the relative attitude angle between the navigation apparatus and the spatial object is 0, if yes, sequentially performing step (7); and otherwise, adjusting the attitude of the navigation apparatus, reducing the relative attitude angle between the navigation apparatus and the spatial object, and returning to step (5); (7) pushing the navigation apparatus towards the spatial object; and (8) repeatedly performing steps (5) to (7), until the navigation apparatus arrives at the spatial object, to complete a relative navigation process.

Preferably, the step (1) further includes the following sub-steps: (1-1) collecting the binocular infrared image by using the first and second infrared imaging sensors, collecting the binocular visible light image by using the first and second visible light imaging sensors, respectively processing the binocular infrared image and the binocular visible light image, and separating the spatial object from a background, to obtain a region of interest of the spatial object; (1-2) extracting a spatial object profile, tracking the spatial object profile, calculating a two-dimensional graphics center of the spatial object profile, to obtain that the coordinates of the center of the spatial object profile in a left visible light image and a right visible light image of the binocular visible light image are respectively $(U_1, V_1)$ and $(U'_1, V'_1)$, thereby further obtaining a center coordinate $$\left( \frac{U'_1 + U_1}{2}, \frac{V'_1 + V_1}{2} \right)$$

of the spatial object in the binocular visible light image; and to obtain that the coordinates of the center of the spatial object profile in a left infrared image and a right infrared image of the binocular infrared image are respectively $(U_2, V_2)$ and $(U'_2, V'_2)$, thereby obtaining a center coordinate $$\left( \frac{U'_2 + U_2}{2}, \frac{V'_2 + V_2}{2} \right)$$

of the spatial object in the binocular infrared image; and reconstructing a spatial distance from the spatial object to the navigation apparatus according to the $(U_1, V_1)$ and $(U'_1, V'_1)$; (1-3) calculating a distance between the center coordinate of the spatial object in the binocular visible light image and an imaging plane center, and a distance between the center coordinate of the spatial object in the binocular infrared image and the imaging plane center, and adjusting the attitude of the navigation apparatus, to enable the center of the spatial object profile to get close to an imaging plane central region; and (1-4) judging whether the center of the spatial object profile is within the imaging plane central region, if yes, completing the detecting and positioning of the spatial object; and otherwise, repeatedly performing steps (1-1) to (1-3), until the center of the spatial object profile falls within the imaging plane central region.

Preferably, the step (3) further includes the following sub-steps: (3-1) collecting the binocular infrared image by using the first and second infrared imaging sensors, collecting the binocular visible light image by using the first and second visible light imaging sensors, and collecting the laser data by using the first to fifth laser distance measuring sensors; (3-2) respectively detecting line segment and angular point features in the binocular infrared image and the binocular visible light image, to obtain a feature point in the binocular infrared image and a feature point in the binocular visible light image; (3-3) matching the feature points in the left infrared image and the right infrared image of the binocular infrared image, matching the feature points in the left visible light image and the right visible light image of the binocular visible light image, and reconstructing the three-dimensional structure information and the three-dimensional distance information of the spatial object; (3-4) correcting the reconstructed three-dimensional distance information of the spatial object by using the laser data collected by the first to fifth laser distance measuring sensors; and (3-5) collecting a binocular infrared sequence image by using the first and second infrared imaging sensors, collecting a binocular visible light sequence image by using the first and second visible light imaging sensors, matching the feature points in the left infrared sequence image and the right infrared sequence image of the binocular infrared sequence image, and matching the feature points in the left visible light sequence image and the right visible light sequence image of the binocular visible light sequence image, to obtain the three-dimensional motion parameter of the spatial object.

Preferably, the step (5) further includes the following sub-steps: (5-1) respectively measuring, by the first to fifth laser distance measuring sensors, distances between the first to fifth laser distance measuring sensors and the spatial object; (5-2) according to the relative distances between the first to fifth laser distance measuring sensors and the spatial object, in combination with the three-dimensional structure information and the three-dimensional motion parameter of the spatial object obtained in step (3), respectively solving relative attitude angles between the first to fifth laser distance measuring sensors and the spatial object; and (5-3) respectively performing weighted averaging operations on the relative distances and the relative attitude angles between the first to fifth laser distance measuring sensors and the spatial object, to obtain the relative distance and the relative attitude angle between the navigation apparatus and the spatial object.

In general, the above technical solution designed through the present invention, as compared with the prior art, has the following beneficial effects:

1. Through the combination of a visible light imaging sensor and an infrared imaging sensor, problems generated when only one navigation mode is used alone can be effectively solved. First of all, the visible light imaging sensor can acquire morphological apparent information of a spatial object when being illuminated with light, and the imaging effect thereof is closest to the human eyes' vision, so that the information on a visible light image is the most intuitive, and the most interested. For example, some angular point information, edge information, topological structure, and the like are all morphological features on which algorithms depend largely. However, in the case where the light condition is not ideal, or there is no light, the morphological features included in a visible light image may not be complete or there is no morphological feature exists in the visible light image, in some cases, a pseudo feature may even appear, which brings difficulties to the realization of pretreatment and algorithm reconstruction. The present invention makes up for the above defects of the visible light imaging sensor through the infrared imaging sensor. The spatial object may not be illuminated under the sunlight, but as long as it is in operation, the internal engine and processor thereof would radiate heat outwards, and imaging would occur on an infrared camera. Moreover, when being irradiated under the sunlight, the spatial object have different temperatures on a face facing to the sunlight and a face opposite thereto, and an infrared image can reflect some attitudes and surface features of the spatial object, which are supplementary to the morphological features in a visible light image. Secondly, an infrared image formed by an infrared imaging sensor has a low sharpness, the expression of the morphological feature of the object has a low integrity, and feature extraction is difficult, while the present invention utilizes the obvious morphological feature of a visible light image formed by a visible light imaging sensor to make up for the above defects of an infrared image.

2. A navigation mode in which a binocular visible light imaging sensor, a binocular infrared imaging sensor, and a laser distance measuring sensor array are combined is adopted, in combination with a passive measurement mode composed of an optical imaging sensor and an active measurement mode composed of a laser distance measuring sensor. Wherein, the autonomous navigation apparatus is equipped with an orientation guiding structure, the binocular visible light imaging sensor is equipped with a scanning structure, and the orientation guiding structure of the autonomous navigation apparatus can realize the adjustment of the range of the field of view of the autonomous navigation apparatus, thereby solving the small field of view, the limited exploration range, and other problems existing in the monocular and binocular navigation, and the scanning structure of the binocular visible light imaging sensor effectively solves the problems such as shielding of the passive measurement navigation mode; as for the active measurement mode composed of the laser distance measuring sensor, the laser distance measuring sensor array simultaneously acquires the distance information of five feature points within a rectangular area on a measured surface of the spatial object, thereby avoiding the defects existing in the scanning mechanism, not only a distance parameter of a target satellite is obtained through data processing, but also a surface morphology of the measured region can be fitted out through calculation, and especially for a close distance, real-time distance information and angle of inclination between a docking port plane of the navigation apparatus and a docking port plane of the spatial object can be obtained through analysis.

3. The autonomous navigation process can be completed substantially in three stages: a remote distance stage, implemented by adopting a navigation mode where a binocular visible light imaging sensor and a binocular infrared imaging sensor are combined, a close distance stage, implemented by adopting a navigation mode where a binocular visible light imaging sensor, a binocular infrared imaging sensor and a laser distance measuring sensor array are combined, and an ultra-close distance stage, implemented by adopting a navigation mode of a laser distance measuring sensor array. Different components are adopted at different distances for data measurement, a navigation mode in which a variety of components are combined is adopted in the remote distance stage and in the close distance stage, thereby ensuring the precision of the data measurement, and improving the navigation efficiency and the safety and reliability of navigation.

DETAILED DESCRIPTION

To describe the objectives, technical solutions, and advantages of the present invention more clearly and understandably, the following makes a further detailed description on the present invention in combination with the accompanying drawings and embodiments. It should be understood that the specific embodiments described herein are merely used to explain the present invention, but is not intended to limit the present invention. In addition, technical features involved in each implementing manner of the present invention described in the following can be combined with each other as long as no conflict is caused.

Figure 1:
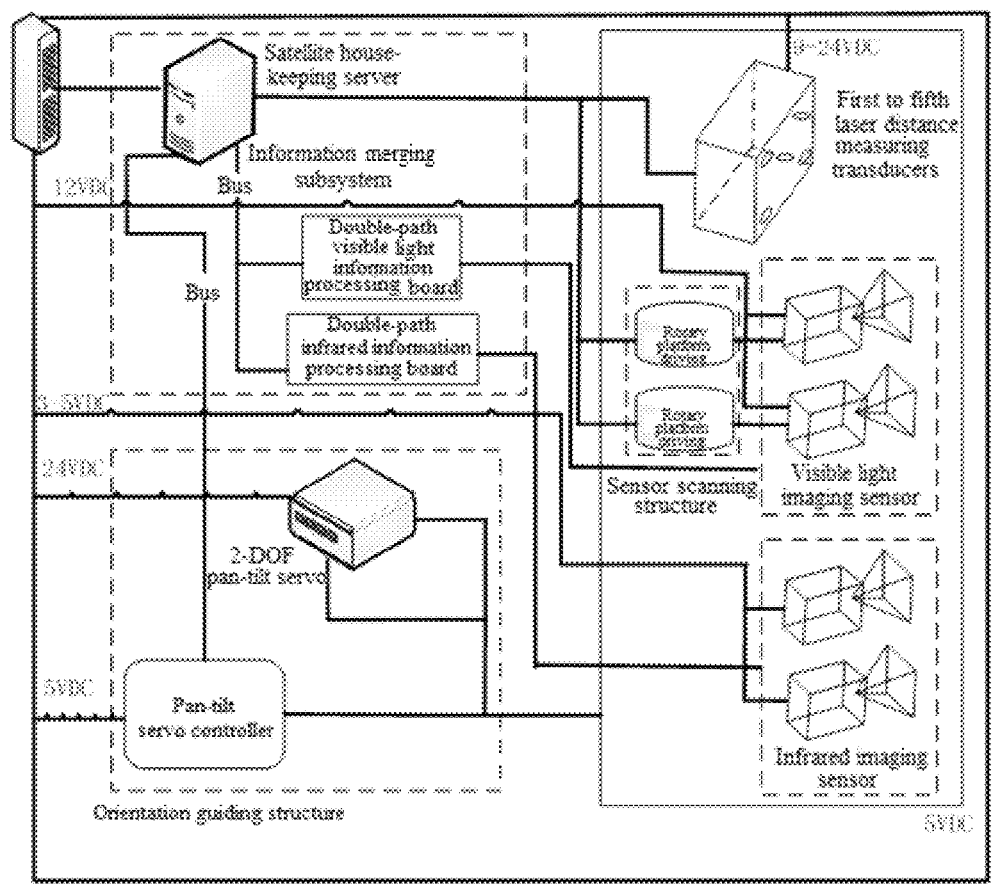
FIG. 1 is a schematic structural view of a super-close distance autonomous navigation apparatus according to the embodiments of the present invention.

As shown in FIG. 1, the super-close distance autonomous navigation apparatus according to the embodiments of the present invention includes: a sensor subsystem, an information merging subsystem, a sensor scanning structure, and an orientation guiding structure; wherein, the sensor subsystem is installed on the orientation guiding structure.

Figure 2:
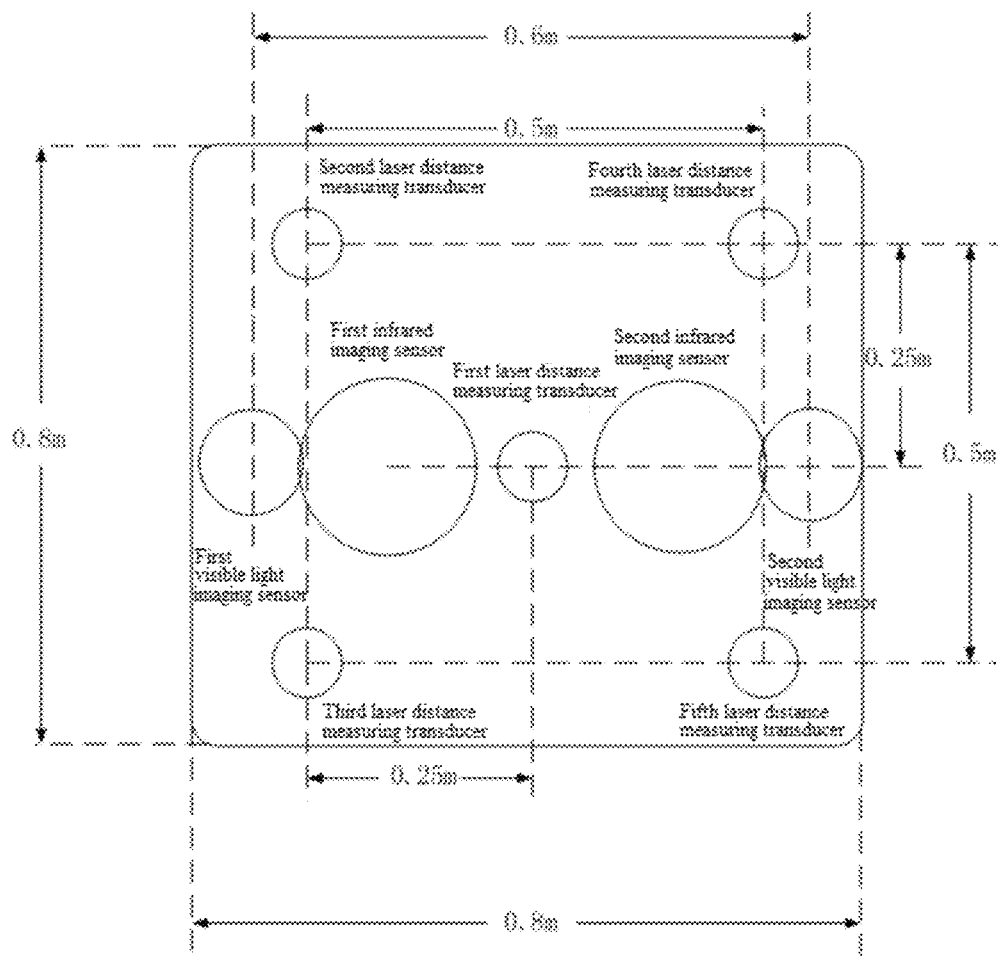
FIG. 2 is a schematic structural view of a sensor subsystem.

As shown in FIG. 2, the sensor subsystem includes first and second infrared imaging sensors, first and second visible light imaging sensors, and first to fifth laser distance measuring sensors. The first visible light imaging sensor, the first infrared imaging sensor, the first laser distance measuring sensor, the second infrared imaging sensor, and the second visible light imaging sensor are arranged in sequence on the same guide rail, the first visible light imaging sensor and the first infrared imaging sensor are symmetrical to the second infrared imaging sensor and the second visible light imaging sensor with respect to the first laser distance measuring sensor. The distances between the second to fifth laser distance measuring sensors and the first laser distance measuring sensor are the same, the second and third laser distance measuring sensors are symmetrical with respect to the guide rail, and the fourth and fifth laser distance measuring sensors are symmetrical with respect to the guide rail.

Figure 3:
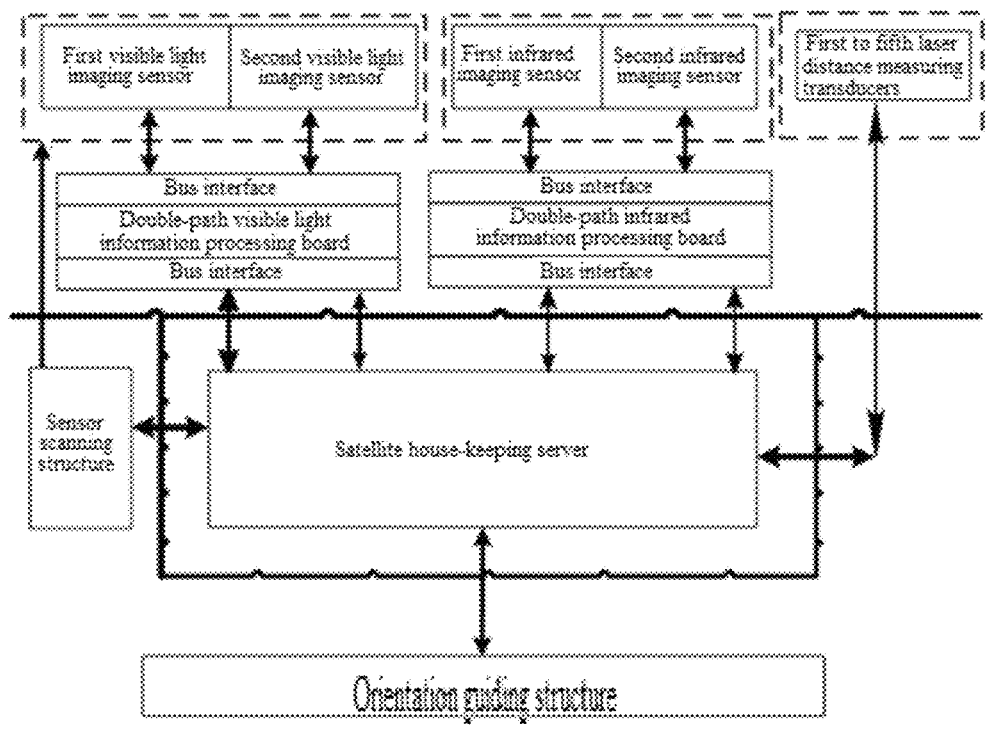
FIG. 3 is a schematic view of hardware connection of the super-close distance autonomous navigation apparatus according to the embodiments of the present invention.

The information merging subsystem includes an infrared information processing board, a visible light information processing board, and a satellite house-keeping server. As shown in FIG. 3, the first and second infrared imaging sensors are respectively connected to the infrared information processing board via a bus, the first and second visible light imaging sensors are respectively connected to the visible light information processing board via the bus, the first to fifth laser distance measuring sensors are respectively connected to the satellite house-keeping server; the infrared information processing board and the visible light information processing board are respectively connected to the satellite house-keeping server via the bus. The infrared information processing board collects in real-time a binocular infrared image by means of the first and second infrared imaging sensors, the visible light information processing board collects in real-time a binocular visible light image by means of the first and second visible light imaging sensors, the satellite house-keeping server collects laser data (the distances between the first to fifth laser distance measuring sensors and a spatial object) by using the first to fifth laser distance measuring sensors, and the infrared information processing board and the visible light information processing board are respectively used to process the binocular infrared image and binocular visible light image, to obtain three-dimensional structure information and attitude information of the spatial object, and send a control instruction for instructing the sensor subsystem to perform attitude adjustment in combination with a relative distance and information of angle of inclination obtained by processing the laser data.

The sensor scanning structure includes first and second rotary platforms, the first and second visible light imaging sensors are respectively installed on the first and second rotary platforms, and the first and second rotary platforms are respectively installed on the guide rail. The first and second rotary platforms are respectively connected to the satellite house-keeping server, and the satellite house-keeping server controls the first and second rotary platforms to rotate, such that the first and second visible light imaging sensors can implement spatial object scanning within a range of a field of view.

The orientation guiding structure includes a two-degree of freedom (2-DOF) pan-tilt and a pan-tilt servo controller. The pan-tilt servo controller is connected to the satellite house-keeping server, for receiving the control instruction from the satellite house-keeping server, and controlling the 2-DOF pan-tilt to perform attitude adjustment on two degrees of freedom, so as to enable the sensor subsystem to perform attitude adjustment.

Figure 4:
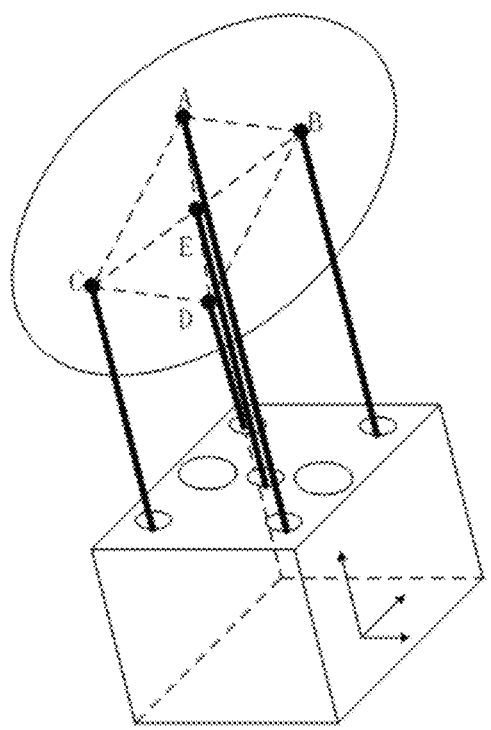
FIG. 4 is a schematic view of a laser distance measuring sensor array.

First of all, the visible light imaging sensor can obtain morphological apparent information of the spatial object when being illuminated with light, and the imaging effect thereof is closest to the human eyes' vision, so that the information on a visible light image is the most intuitive, and the most interested. The infrared imaging sensor can make up for the defects such as incompleteness or absence of the morphological feature or the presence of a pseudo feature of the visible light image in the case where the light condition is not ideal, or there is no light, and the above apparatus combines the visible light imaging sensor with the infrared imaging sensor, thereby effectively solving the problems existing in a navigation mode when one of the two is used alone. Next, the binocular visible light imaging sensor composed of the first and second visible light imaging sensors, the binocular infrared imaging sensor composed of the first and second infrared imaging sensors, and the laser distance measuring sensor array composed of the first to fifth laser distance measuring sensors are used to combine the passive measurement mode composed of the optical imaging sensor with the active measurement mode composed of the laser distance measuring sensor. Wherein, the autonomous navigation apparatus is equipped with an orientation guiding structure, the binocular visible light imaging sensor is equipped with a sensor scanning structure, the orientation guiding structure of the autonomous navigation apparatus can realize the adjustment of the time length range of the autonomous navigation apparatus, thereby solving the small field of view, the limited exploration range, and other problems existing in the monocular and binocular navigation, the sensor scanning structure of the binocular visible light imaging sensor effectively solves the problems such as shielding of the passive measurement navigation mode; as for the active measurement mode composed of the laser distance measuring sensor, as shown in FIG. 4, the laser distance measuring sensor array composed of the first to fifth laser distance measuring sensors simultaneously acquires the distance information of five feature points within a rectangular area on a measured surface of the spatial object, thereby avoiding the defects existing in the scanning mechanism, not only a distance parameter of a target satellite is obtained through data processing, but also a surface morphology of the measured region can be fitted out through calculation, and especially for a close distance, real-time distance information and angle of inclination between a docking port plane of the navigation apparatus and a docking port plane of the spatial object can be obtained through analysis.

Figure 5:
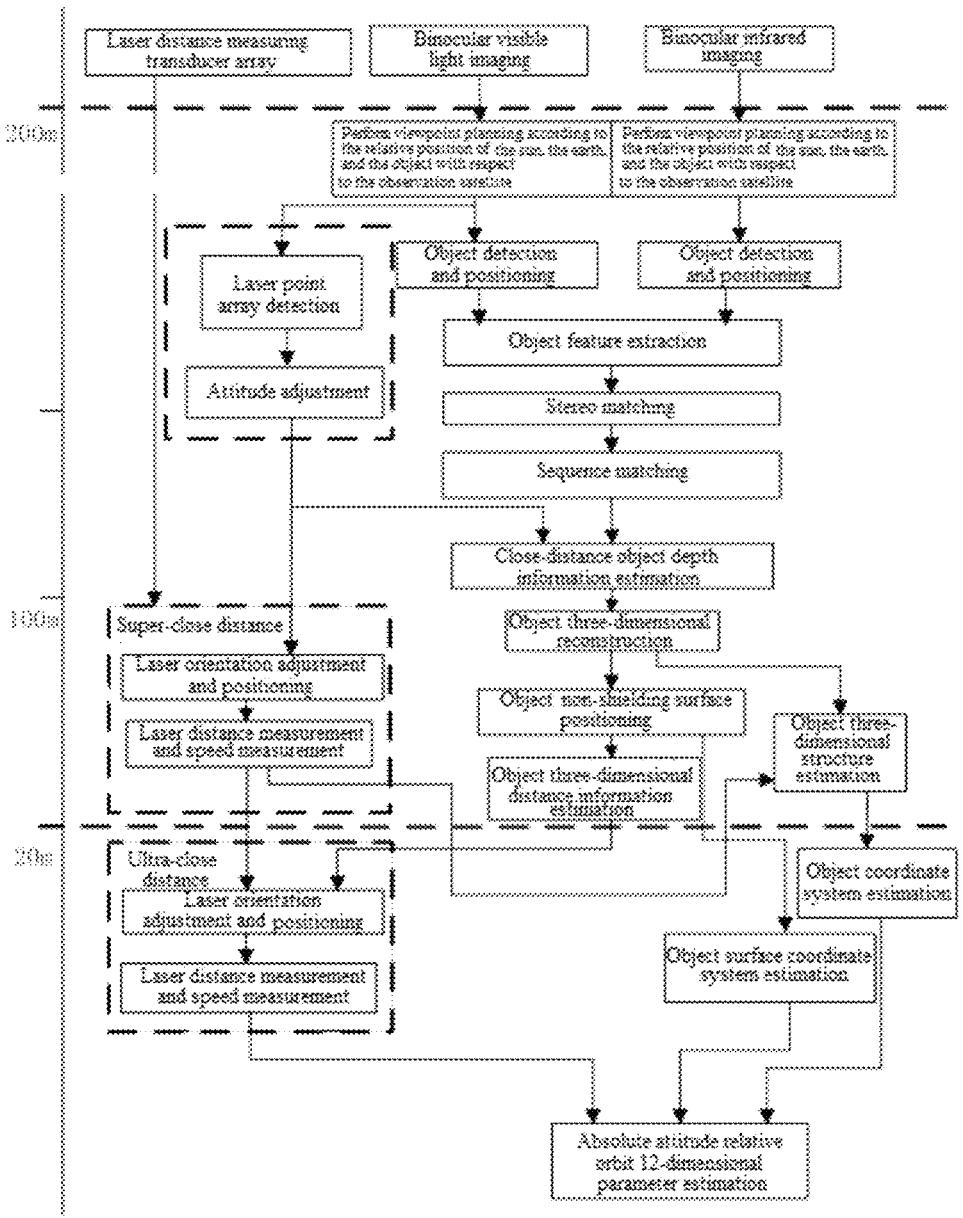
FIG. 5 is a schematic flow chart of a super-close distance autonomous navigation method according to the embodiments of the present invention.

As shown in FIG. 5, the method for implementing super-close distance autonomous navigation by using the above apparatus includes the following steps:

(1) collecting a binocular infrared image by using first and second infrared imaging sensors, collecting a binocular visible light image by using first and second visible light imaging sensors, and detecting and positioning a spatial object by using the binocular infrared image and the binocular visible light image, to obtain a relative distance between the navigation apparatus and the spatial object;

(2) judging whether the relative distance between the navigation apparatus and the spatial object is greater than 100 m, if yes, pushing the navigation apparatus towards the spatial object, and returning to step (1); and otherwise, sequentially performing step (3);

(3) collecting a binocular infrared image by using the first and second infrared imaging sensors, collecting a binocular visible light image by using the first and second visible light imaging sensors, collecting laser data by using first to fifth laser distance measuring sensors, and using the binocular infrared image, the binocular visible light image, and the laser data to obtain three-dimensional structure information, three-dimensional distance information, and a three-dimensional motion parameter of the spatial object;

(4) judging whether the relative distance between the navigation apparatus and the spatial object is greater than 20 m according to the three-dimensional distance information of the spatial object, if yes, pushing the navigation apparatus towards the spatial object, and returning to step (3); and otherwise, sequentially performing step (5);

(5) collecting laser data by using the first to fifth laser distance measuring sensors, and using the laser data, in combination with the three-dimensional structure information and the three-dimensional motion parameter of the spatial object obtained in step (3), to obtain the relative distance and a relative attitude angle between the navigation apparatus and the spatial object;

(6) judging whether the relative attitude angle between the navigation apparatus and the spatial object is 0, if yes, sequentially performing step (7); and otherwise, adjusting the attitude of the navigation apparatus, reducing the relative attitude angle between the navigation apparatus and the spatial object, and returning to step (5);

(7) pushing the navigation apparatus towards the spatial object; and (8) repeatedly performing steps (5) to (7), until the navigation apparatus arrives at the spatial object, to complete a relative navigation process.

Figure 6:
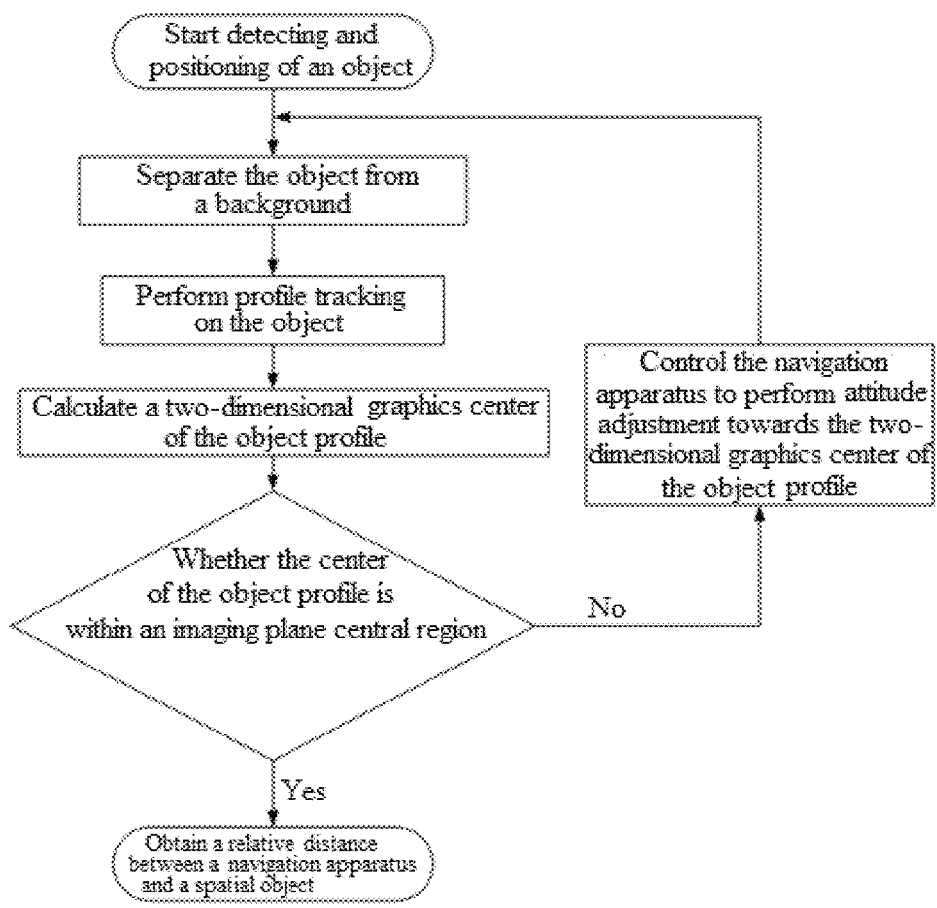
FIG. 6 is a flow chart of detecting and positioning a spatial object in a remote distance stage.

As shown in FIG. 6, the above step (1) further includes the following sub-steps:

(1-1) collecting the binocular infrared image by using the first and second infrared imaging sensors, collecting the binocular visible light image by using the first and second visible light imaging sensors, respectively processing the binocular infrared image and the binocular visible light image, and separating the spatial object from a background, to obtain a region of interest of the spatial object;

(1-2) extracting a spatial object profile, tracking the spatial object profile, calculating a two-dimensional graphics center of the spatial object profile, to obtain that the coordinates of the center of the spatial object profile in a left visible light image and a right visible light image of the binocular visible light image are respectively $(U_1,V_1)$ and $(U'_1,V'_1)$, thereby further obtaining a center coordinate $$\left(\frac{U'_1+U_1}{2}, \frac{V'_1+V_1}{2}\right)$$

of the spatial object in the binocular visible light image; and to obtain that the coordinates of the center of the spatial object profile in a left infrared image and a right infrared image of the binocular infrared image are respectively $(U_2,V_2)$ and $(U'_2,V'_2)$, thereby obtaining a center coordinate $$\left(\frac{U'_2+U_2}{2}, \frac{V'_2+V_2}{2}\right)$$

of the spatial object in the binocular infrared image; and reconstructing a spatial distance from the spatial object to the navigation apparatus according to the $(U_1,V_1)$ and $(U'_1,V'_1)$;

(1-3) calculating a distance between the center coordinate of the spatial object in the binocular visible light image and an imaging plane center, and a distance between the center coordinate of the spatial object in the binocular infrared image and the imaging plane center, and adjusting the attitude of the navigation apparatus, to enable the center of the spatial object profile to get close to an imaging plane central region; and (1-4) judging whether the center of the spatial object profile is within the imaging plane central region, if yes, completing the detecting and positioning of the spatial object; and otherwise, repeatedly performing steps (1-1) to (1-3), until the center of the spatial object profile falls within the imaging plane central region.

Figure 7:
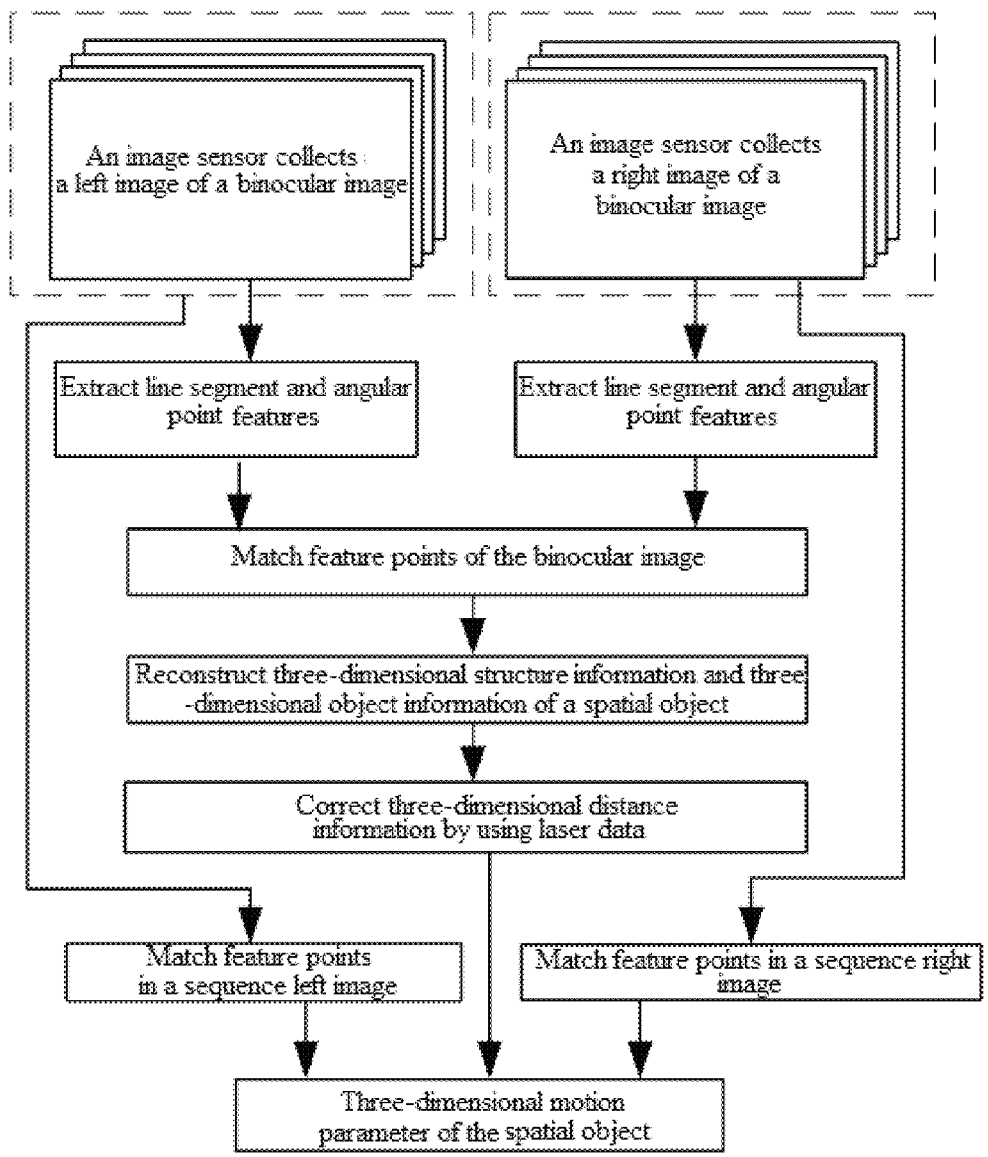
FIG. 7 is a flow chart of three-dimensional structure motion analysis of a spatial object in a close distance stage.

As shown in FIG. 7, the above step (3) further includes the following sub-steps:

(3-1) collecting the binocular infrared image by using the first and second infrared imaging sensors, collecting the binocular visible light image by using the first and second visible light imaging sensors, and collecting the laser data by using the first to fifth laser distance measuring sensors;

(3-2) respectively detecting line segment and angular point features in the binocular infrared image and the binocular visible light image, to obtain a feature point in the binocular infrared image and a feature point in the binocular visible light image;

(3-3) matching the feature points in the left infrared image and the right infrared image of the binocular infrared image, matching the feature points in the left visible light image and the right visible light image of the binocular visible light image, and reconstructing the three-dimensional structure information and the three-dimensional distance information of the spatial object;

(3-4) correcting the reconstructed three-dimensional distance information of the spatial object by using the laser data collected by the first to fifth laser distance measuring sensors; and (3-5) collecting a binocular infrared sequence image by using the first and second infrared imaging sensors, collecting a binocular visible light sequence image by using the first and second visible light imaging sensors, matching the feature points in the left infrared sequence image and the right infrared sequence image of the binocular infrared sequence image, and matching the feature points in the left visible light sequence image and the right visible light sequence image of the binocular visible light sequence image, to obtain the three-dimensional motion parameter of the spatial object.

Figure 8:
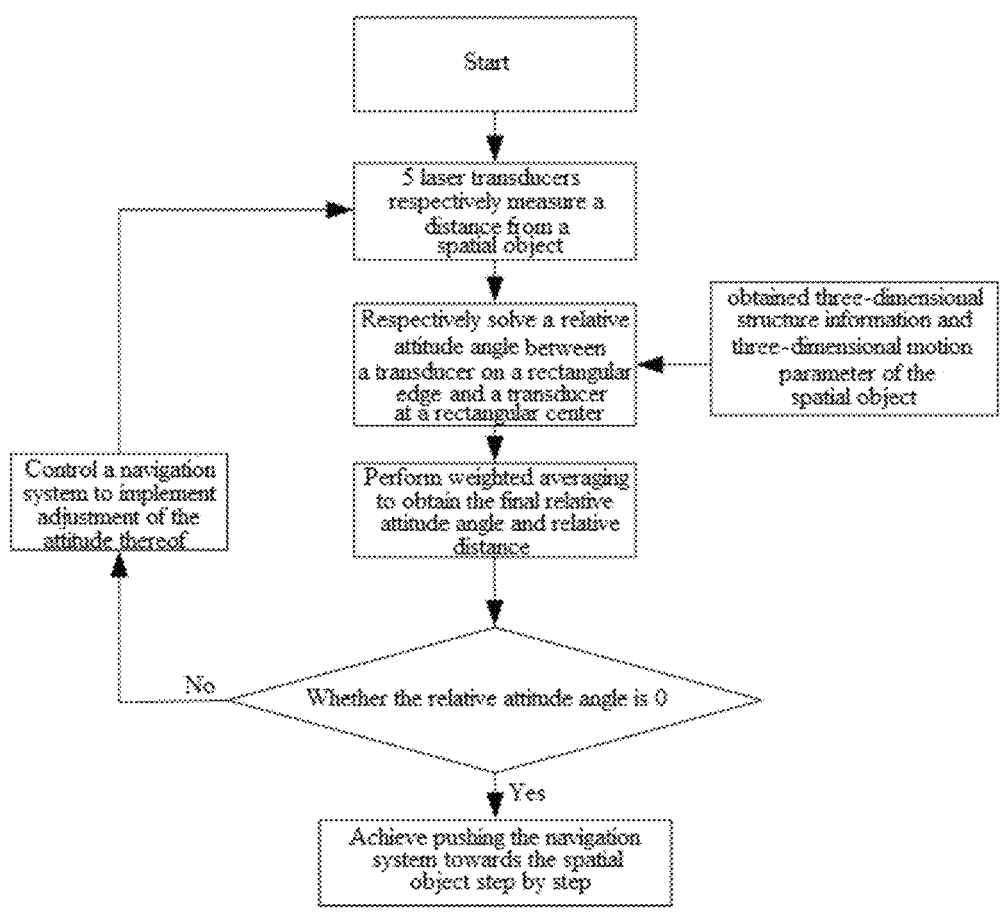
FIG. 8 is a flow chart of acquiring a relative distance and a relative attitude angle between the navigation apparatus and the spatial object in a ultra-close distance stage.
Figure 9:
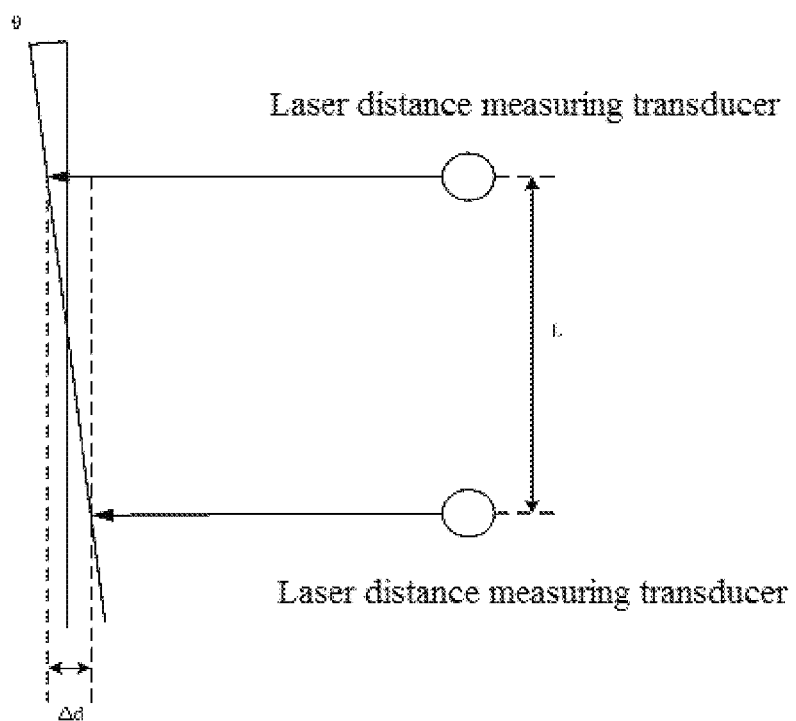
FIG. 9 is a schematic view of laser distance measurement and angle measurement.

As shown in FIG. 8, the above step (5) further includes the following sub-steps:

(5-1) respectively measuring, by the first to fifth laser distance measuring sensors, distances between the first to fifth laser distance measuring sensors and the spatial object;

(5-2) according to the relative distances between the first to fifth laser distance measuring sensors and the spatial object, in combination with the three-dimensional structure information and the three-dimensional motion parameter of the spatial object obtained in step (3), respectively solving relative attitude angles between the first to fifth laser distance measuring sensors and the spatial object, as shown in FIG. 9; and (5-3) respectively performing weighted averaging operations on the relative distances and the relative attitude angles between the first to fifth laser distance measuring sensors and the spatial object, to obtain the relative distance and the relative attitude angle between the navigation apparatus and the spatial object.

The above autonomous navigation process can be completed substantially in three stages: a remote distance stage, implemented by adopting a navigation mode where a binocular visible light imaging sensor and a binocular infrared imaging sensor are combined, a close distance stage, implemented by adopting a navigation mode where a binocular visible light imaging sensor, a binocular infrared imaging sensor and a laser distance measuring sensor array are combined, and an ultra-close distance stage, implemented by adopting a navigation mode of a laser distance measuring sensor array. Different components are adopted at different distances for data measurement, a navigation mode in which a variety of components are combined is adopted in the remote distance stage and in the close distance stage, thereby ensuring the precision of the data measurement, and improving the navigation efficiency and the safety and reliability of navigation. When the autonomous navigation apparatus detects a spatial object within a distance range of 100 m through the binocular infrared imaging sensor and the binocular visible light imaging sensor, the laser distance measuring sensor array composed of the first to fifth laser distance measuring sensors is started for measurement, and the laser distance measuring sensor array is adopted to simultaneously acquire the distance information of five feature points on a measured surface of the spatial object, not only a distance parameter of a target satellite is obtained through data processing, but also a surface morphology of the measured region can be fitted out through calculation, and especially for a close distance, real-time distance information and angle of inclination between a docking port plane of the navigation apparatus and a docking port plane of the spatial object can be obtained through analysis.

It is easy for a person skilled in the art to understand that, the above merely gives preferred embodiments of the present invention, and is not intended to limit the present invention. Any modification, equivalent replacement, improvement and the like made within the spirit and principle of the present invention shall fall within the protection scope of the present invention.

The invention claimed is:

1. An autonomous navigation apparatus, comprising a sensor subsystem, an information merging subsystem, a sensor scanning structure, and an orientation guiding structure; wherein,
   the sensor subsystem is installed on the orientation guiding structure, and comprises first and second infrared imaging sensors, first and second visible light imaging sensors, and first to fifth laser distance measuring sensors;
   the information merging subsystem comprises an infrared information processing board, a visible light information processing board, and a satellite house-keeping server; the first and second infrared imaging sensors are respectively connected to the infrared information processing board via a bus, the first and second visible light imaging sensors are respectively connected to the visible light information processing board via the bus, the first to fifth laser distance measuring sensors are respectively connected to the satellite house-keeping server, the infrared information processing board and the visible light information processing board are respectively connected to the satellite house-keeping server via the bus; and the satellite house-keeping server is configured to send a control instruction for instructing the sensor subsystem to perform attitude adjustment in combination with a binocular infrared image collected by the first and second infrared imaging sensors, a binocular visible light image collected by the first and second visible light imaging sensors, and laser data collected by the first to fifth laser distance measuring sensors;
   the sensor scanning structure includes first and second rotary platforms connected to the satellite house-keeping server, the first and second visible light imaging sensors are respectively installed on the first and second rotary platforms, and the satellite house-keeping server controls the first and second rotary platforms to rotate, such that the first and second visible light imaging sensors can implement spatial object scanning within a range of a field of view;
   the orientation guiding structure includes a 2-DOF pan-tilt and a pan-tilt servo controller; and the pan-tilt servo controller is connected to the satellite house-keeping server, for receiving a control instruction from the satellite house-keeping server, to control the 2-DOF pan-tilt to perform attitude adjustment, so as to enable the sensor subsystem to perform attitude adjustment.

2. The autonomous navigation apparatus of claim 1, wherein, the first visible light imaging sensor, the first infrared imaging sensor, the first laser distance measuring sensor, the second infrared imaging sensor, and the second visible light imaging sensor are arranged in sequence on the same guide rail, the first visible light imaging sensor and the first infrared imaging sensor are symmetrical to the second infrared imaging sensor and the second visible light imaging sensor with respect to the first laser distance measuring sensor; the second to fifth laser distance measuring sensors have the same distance from the first laser distance measuring sensor, the second and third laser distance measuring sensors are symmetrical with respect to the guide rail, and the fourth and fifth laser distance measuring sensors are symmetrical with respect to the guide rail.

3. An autonomous navigation method using the apparatus of claim 1, comprising the following steps:
   (1) collecting a binocular infrared image by using first and second infrared imaging sensors, collecting a binocular visible light image by using first and second visible light imaging sensors, and detecting and positioning a spatial object by using the binocular infrared image and the binocular visible light image, to obtain a relative distance between the navigation apparatus and the spatial object;
   (2) judging whether the relative distance between the navigation apparatus and the spatial object is greater than 100 m, if yes, pushing the navigation apparatus towards the spatial object, and returning to step (1); and otherwise, sequentially performing step (3);
   (3) collecting a binocular infrared image by using the first and second infrared imaging sensors, collecting a binocular visible light image by using the first and second visible light imaging sensors, collecting laser data by using first to fifth laser distance measuring sensors, and using the binocular infrared image, the binocular visible light image, and the laser data to obtain three-dimensional structure information, three-dimensional distance information, and a three-dimensional motion parameter of the spatial object;

(4) judging whether the relative distance between the navigation apparatus and the spatial object is greater than 20 m according to the three-dimensional distance information of the spatial object, if yes, pushing the navigation apparatus towards the spatial object, and returning to step (3); and otherwise, sequentially performing step (5);

(5) collecting laser data by using the first to fifth laser distance measuring sensors, and using the laser data, in combination with the three-dimensional structure information and the three-dimensional motion parameter of the spatial object obtained in step (3), to obtain the relative distance and a relative attitude angle between the navigation apparatus and the spatial object;

(6) judging whether the relative attitude angle between the navigation apparatus and the spatial object is 0, if yes, sequentially performing step (7); and otherwise, adjusting the attitude of the navigation apparatus, reducing the relative attitude angle between the navigation apparatus and the spatial object, and returning to step (5);

(7) pushing the navigation apparatus towards the spatial object; and (8) repeatedly performing steps (5) to (7), until the navigation apparatus arrives at the spatial object, to complete a relative navigation process.

4. The autonomous navigation method of claim 3, wherein the step (1) further includes the following sub-steps:

(1-1) collecting the binocular infrared image by using the first and second infrared imaging sensors, collecting the binocular visible light image by using the first and second visible light imaging sensors, respectively processing the binocular infrared image and the binocular visible light image, and separating the spatial object from a background, to obtain a region of interest of the spatial object;

(1-2) extracting a spatial object profile, tracking the spatial object profile, calculating a two-dimensional graphics center of the spatial object profile, to obtain that the coordinates of the center of the spatial object profile in a left visible light image and a right visible light image of the binocular visible light image are respectively $(U_1,V_1)$ and $(U'_1,V'_1)$, thereby further obtaining a center coordinate $$\left(\frac{U'_1 + U_1}{2}, \frac{V'_1 + V_1}{2}\right)$$

of the spatial object in the binocular visible light image; and to obtain that the coordinates of the center of the spatial object profile in a left infrared image and a right infrared image of the binocular infrared image are respectively $(U_2,V_2)$ and $(U'_2,V'_2)$, thereby obtaining a center coordinate $$\left(\frac{U'_2 + U_2}{2}, \frac{V'_2 + V_2}{2}\right)$$

of the spatial object in the binocular infrared image; and reconstructing a spatial distance from the spatial object to the navigation apparatus according to the $(U_1,V_1)$ and $(U'_1,V'_1)$;

(1-3) calculating a distance between the center coordinate of the spatial object in the binocular visible light image and an imaging plane center, and a distance between the center coordinate of the spatial object in the binocular infrared image and the imaging plane center, and adjusting the attitude of the navigation apparatus, to enable the center of the spatial object profile to get close to an imaging plane central region; and (1-4) judging whether the center of the spatial object profile is within the imaging plane central region, if yes, completing the detecting and positioning of the spatial object; and otherwise, repeatedly performing steps (1-1) to (1-3), until the center of the spatial object profile falls within the imaging plane central region.

5. The autonomous navigation method of claim 3, wherein the step (3) further includes the following sub-steps:

(3-1) collecting the binocular infrared image by using the first and second infrared imaging sensors, collecting the binocular visible light image by using the first and second visible light imaging sensors, and collecting the laser data by using the first to fifth laser distance measuring sensors;

(3-2) respectively detecting line segment and angular point features in the binocular infrared image and the binocular visible light image, to obtain a feature point in the binocular infrared image and a feature point in the binocular visible light image;

(3-3) matching the feature points in the left infrared image and the right infrared image of the binocular infrared image, matching the feature points in the left visible light image and the right visible light image of the binocular visible light image, and reconstructing the three-dimensional structure information and the three-dimensional distance information of the spatial object;

(3-4) correcting the reconstructed three-dimensional distance information of the spatial object by using the laser data collected by the first to fifth laser distance measuring sensors; and (3-5) collecting a binocular infrared sequence image by using the first and second infrared imaging sensors, collecting a binocular visible light sequence image by using the first and second visible light imaging sensors, matching the feature points in the left infrared sequence image and the right infrared sequence image of the binocular infrared sequence image, and matching the feature points in the left visible light sequence image and the right visible light sequence image of the binocular visible light sequence image, to obtain the three-dimensional motion parameter of the spatial object.

6. The autonomous navigation method of claim 3, wherein the step (5) further includes the following sub-steps:

(5-1) respectively measuring, by the first to fifth laser distance measuring sensors, distances between the first to fifth laser distance measuring sensors and the spatial object;

(5-2) according to the relative distances between the first to fifth laser distance measuring sensors and the spatial object, in combination with the three-dimensional structure information and the three-dimensional motion parameter of the spatial object obtained in step (3), respectively solving relative attitude angles between the first to fifth laser distance measuring sensors and the spatial object; and (5-3) respectively performing weighted averaging operations on the relative distances and the relative attitude angles between the first to fifth laser distance measuring sensors and the spatial object, to obtain the relative distance and the relative attitude angle between the navigation apparatus and the spatial object.

* * * * *